US011993741B2

(12) United States Patent
Sakurai et al.

(10) Patent No.: US 11,993,741 B2
(45) Date of Patent: May 28, 2024

(54) LIQUID CRYSTAL DEVICE, OPTICAL SYSTEM, SPATIAL PHASE MODULATOR, AND METHOD OF MANUFACTURING LIQUID CRYSTAL DEVICE

(71) Applicants: santec Holdings Corporation, Komaki (JP); SANYO-ONODA CITY PUBLIC UNIVERSITY CORPORATION, Sanyo-Onoda (JP)

(72) Inventors: Yasuki Sakurai, Komaki (JP); Koki Takatou, Sanyo-Onoda (JP)

(73) Assignees: santec Holdings Corporation, Aichi (JP); SANYO-ONODA CITY PUBLIC UNIVERSITY CORPORATION, Yamaguchi (JP)

( * ) Notice: Subject to any disclaimer, the term of this patent is extended or adjusted under 35 U.S.C. 154(b) by 0 days.

(21) Appl. No.: 17/766,419

(22) PCT Filed: Oct. 10, 2019

(86) PCT No.: PCT/JP2019/040126
§ 371 (c)(1),
(2) Date: Apr. 4, 2022

(87) PCT Pub. No.: WO2021/070351
PCT Pub. Date: Apr. 15, 2021

(65) Prior Publication Data
US 2023/0140510 A1    May 4, 2023

(51) Int. Cl.
*C09K 19/56* (2006.01)
*G02F 1/1333* (2006.01)
(Continued)

(52) U.S. Cl.
CPC ........ *C09K 19/56* (2013.01); *G02F 1/133734* (2013.01); *G02F 1/13439* (2013.01);
(Continued)

(58) Field of Classification Search
CPC .............. C09K 19/56; G02F 1/133734; G02F 1/13439; G02F 1/136277; G02F 1/133331; G02F 2203/12
See application file for complete search history.

(56) References Cited

U.S. PATENT DOCUMENTS

2011/0101270 A1   5/2011   Manabe et al.
2016/0103342 A1   4/2016   Hong et al.
(Continued)

FOREIGN PATENT DOCUMENTS

JP    H09291282 A    11/1997
JP    H1036847 A     2/1998
(Continued)

OTHER PUBLICATIONS

English translation of International Preliminary Report on Patentability and Written Opinion (form PCT/IB/338, Form PCT/IB/373, and form PCTIB/237) in PCT/JP2019/040126 dated Apr. 12, 2022 (9 pages).

(Continued)

*Primary Examiner* — Nathanael R Briggs
(74) *Attorney, Agent, or Firm* — Meunier Carlin & Curfman LLC

(57) ABSTRACT

A liquid crystal device in one aspect of the present disclosure includes a liquid crystal layer, and an electrode layer configured to form an electric field in the liquid crystal layer. The liquid crystal layer includes a liquid crystal composition in which an organic compound having a property of inhibiting a polymerization reaction caused by light action is added to a liquid crystal mixture as a polymerization inhibitor.

13 Claims, 4 Drawing Sheets

(51) Int. Cl.
*G02F 1/1337* (2006.01)
*G02F 1/1343* (2006.01)
*G02F 1/1362* (2006.01)

(52) U.S. Cl.
CPC .. *G02F 1/136277* (2013.01); *G02F 1/133331* (2021.01); *G02F 2203/12* (2013.01)

(56) References Cited

U.S. PATENT DOCUMENTS

| | | | | |
|---|---|---|---|---|
| 2021/0063788 | A1* | 3/2021 | Okazaki | G02F 1/134336 |
| 2021/0221224 | A1* | 7/2021 | Christmas | G03H 1/08 |

FOREIGN PATENT DOCUMENTS

| | | | | |
|---|---|---|---|---|
| JP | 2005100609 | A | | 4/2005 |
| JP | 2006169472 | A | | 6/2006 |
| JP | 2010197450 | A | | 9/2010 |
| JP | 2011519985 | A | | 7/2011 |
| JP | 201412836 | A | | 1/2014 |
| JP | 2014012836 | A | * | 1/2014 |
| JP | 2020076826 | A | | 5/2020 |
| WO | WO-2019048867 | A1 | * | 3/2019 ........... G02F 1/1313 |

OTHER PUBLICATIONS

Notices of Reason(s) for Rejection dated Jan. 10, 2023 in the corresponding Japanese Patent Application No. 2021-551064 with English machine translation (9 pages).
Notices of Reason(s) for Rejection issued on Jan. 10, 2023 in the corresponding Japanese Patent Application No. 2022-507740 with English machine translation (15 pages).
International Search Report in Application No. PCT/JP2019/040126, dated Dec. 10, 2019, 2 pages.
Yasuki Sakurai "Laser Processing Technique using LCOS Technology"; pp. 129-133; Ekisho, vol. 2, No. 22; published in Japan by the Japanese Liquid Crystal Society on Apr. 25, 2018, 11 pages.
Yasuki Sakuri, Masashi Nishitateno, Masahiro Ito and Kohki Takatoh , "UV Durable LCOS for Laser Processing" by Crystals 2021, 8 pages.
4 International search report and written option (ISA210, 220 and 237) of PCT/JP2021/026990 (in Japanese), 11 pages.

* cited by examiner

LIQUID CRYSTAL DEVICE, OPTICAL SYSTEM, SPATIAL PHASE MODULATOR, AND METHOD OF MANUFACTURING LIQUID CRYSTAL DEVICE

CROSS REFERENCE TO RELATED APPLICATIONS

This application is a United States National Phase Patent Application of International Patent Application Number PCT/JP2019/040126, filed on Oct. 10, 2019, which is incorporated by reference herein in its entirety.

TECHNICAL FIELD

The present disclosure relates to a liquid crystal device, an optical system, and a spatial phase modulator.

BACKGROUND ART

As a liquid crystal device, an LCOS (Liquid Crystal On Silicon) device is already known. In recent years, LCOS devices developed for display use have been beginning to be applied in various fields.

For example, applications of the LCOS devices as spatial phase modulators have been studied in technical fields of optical communication technology, laser processing technology, compensation optics technology, optical manipulation technology, pulse/spectrum shaping technology, and the like. The inventor of the present disclosure has already disclosed a laser processing system using an LCOS device (see, Non-Patent Document 1).

PRIOR ART DOCUMENTS

Non-Patent Document

Non-Patent Document 1: Yasuki SAKURAI "Laser Processing Technique using LCOS Technology"; pages 129-133; EKISHO, vol. 2, No. 22; published in Japan by the Japanese Liquid Crystal Society on Apr. 25, 2018.

SUMMARY OF THE INVENTION

Problems to be Solved by the Invention

In a laser processing system using an LCOS device, a processing-target surface can be processed in one shot by using an LCOS phase-modulated image generated through Computer Generated Hologram (CGH). Such an LCOS device is therefore expected to have significantly improved processing performance compared to conventional scanning-type laser processing systems.

However, publicly known liquid crystal devices including the LCOS devices do not have enough durability against an input of high-energy light; and therefore, those liquid crystal devices are susceptible to damage. One cause of such damage is heat generation due to light absorption of a material included in the liquid crystal devices.

The inventor of the present disclosure has already disclosed a technique to inhibit heat generation due to light absorption by selecting materials to be included in the liquid crystal devices. However, more improvement can still be made in terms of durability of the liquid crystal devices against an input of high-energy light.

Now, one aspect of the present disclosure desirably provides a new technique that enables improvements in durability of a liquid crystal device.

Means for Solving the Problems

A liquid crystal device in one aspect of the present disclosure includes a liquid crystal layer, and an electrode layer. The electrode layer is configured to create an electric field in the liquid crystal layer. The liquid crystal layer includes a liquid crystal composition in which an organic compound having a property of inhibiting a polymerization reaction caused by light action is added to a liquid crystal mixture as a polymerization inhibitor. Examples of the polymerization inhibitor may include an organic compound having a property of inhibiting radical polymerization.

The inventor of the present disclosure found that damage of the liquid crystal device include not only damage caused by heat generation but also those caused by a polymerization reaction, in particular, radical polymerization, which is a polymerization reaction including a radical generated by the light action as a chain propagation center.

In the liquid crystal layer that includes the aforementioned polymerization inhibitor, a polymerization reaction caused by the light action can be inhibited. For example, in a liquid crystal layer that includes an organic compound having a property of inhibiting radical polymerization as the polymerization inhibitor, it is possible to inhibit chain reaction of addition of monomers with radicals, generated due to the light action, acting as the chain propagation center, and accordingly inhibit a progress of polymerization.

The liquid crystal device in one aspect of the present disclosure can accordingly inhibit damage caused by a polymerization reaction due to the light action, which then enables improvement in durability of the liquid crystal device against light, in particular against an input of high-energy light.

According to one aspect of the present disclosure, the liquid crystal mixture may be one that demonstrates a nematic liquid crystalline property. According to one aspect of the present disclosure, the liquid crystal mixture may include a liquid crystal compound having a tolan structure. In this case, the polymerization inhibitor may have a property of inhibiting radical polymerization caused by the light action to the tolan structure.

In a case where the liquid crystal layer includes a liquid crystal compound having a tolan structure, a polymerization reaction with the chain propagation center being a radical generated by the light action to the tolan structure is likely to occur. It is therefore very productive to include the polymerization inhibitor in the liquid crystal device.

According to one aspect of the present disclosure, the liquid crystal composition may include 0.01 wt. % to 20 wt. % of the polymerization inhibitor. According to one aspect of the present disclosure, the liquid crystal composition may include 0.05 wt. % to 10 wt. % of the polymerization inhibitor. Addition of the polymerization inhibitor to the liquid crystal mixture within the said proportions enable inhibition of unwanted changes in physical properties of the liquid crystal layer while effectively inhibiting the polymerization reaction caused by the light action.

According to one aspect of the present disclosure, the liquid crystal composition may include 3 wt. % or more of the polymerization inhibitor, for example, in a range of 3 wt. % to 10 wt. %. By adding highly-concentrated, in particular, 3 wt. % or more concentration of the polymerization inhibitor to the liquid crystal mixture, the durability of the liquid crystal device against an input of high-energy light can be improved more effectively.

According to one aspect of the present disclosure, the polymerization inhibitor may be an organic compound having an aromatic ring structure, and an alkyl group structure having carbon number 3 or greater. This polymerization inhibitor enables a highly concentrated addition of the polymerization inhibitor to the liquid crystal mixture.

According to one aspect of the present disclosure, the electrode layer may include a transparent electrode layer disposed above the liquid crystal layer, and a lower electrode layer disposed below the liquid crystal layer. According to one aspect of the present disclosure, alignment films, configured to control an initial alignment of liquid crystal molecules in the liquid crystal layer vertically, may be disposed between the liquid crystal layer and the transparent electrode layer, and between the liquid crystal layer and the lower electrode layer. The liquid crystal layer may be formed as a vertical alignment (VA) liquid crystal layer. The liquid crystal device may be created as a vertical alignment (VA) type liquid crystal device.

According to one aspect of the present disclosure, alignment films, configured to control an initial alignment of liquid crystal molecules in the liquid crystal layer horizontally, may be disposed between the liquid crystal layer and the transparent electrode layer, and between the liquid crystal layer and the lower electrode layer. The liquid crystal layer may be formed as a horizontal alignment (HA) liquid crystal layer. The liquid crystal device may be created as a horizontal alignment (HA) type liquid crystal device.

According to one aspect of the present disclosure, the liquid crystal device may be created as an LCOS device having the electrode layer and the liquid crystal layer interposed between a silicon substrate and a cover glass. Such an LCOS device that can inhibit damage by polymerization reactions caused by the light action, in particular damage by radical polymerization, shows excellent durability in an application that includes an input of high-energy light.

One aspect of the present disclosure may provide an optical system that includes a light source, and the aforementioned liquid crystal device configured to receive an input of laser light from the light source. The optical system may further include a controller that is configured to control the liquid crystal device. The liquid crystal device can be controlled by the controller to modulate the laser light and output thus modulated laser light. According to one aspect of the present disclosure, the liquid crystal device can be used to improve the durability of the system that modulate high-energy light.

One aspect of the present disclosure may provide a liquid-crystal-type spatial phase modulator. The spatial phase modulator may include a solid material layer configured to receive an input of light; a transparent electrode layer disposed below the solid material layer; a first alignment film layer disposed below the transparent electrode layer; a liquid crystal layer disposed below the first alignment film layer; a second alignment film layer disposed below the liquid crystal layer; a lower electrode layer disposed below the second alignment film layer; and a silicon substrate disposed below the lower electrode layer.

According to one aspect of the present disclosure, the transparent electrode layer may be an indium tin oxide (ITO) transparent electrode layer. The solid material layer may be a cover glass, and may also be a glass layer of sapphire or quartz. The first alignment film layer and the second alignment film layer may each be an inorganic alignment film layer made of silicon oxide (SiOx). The liquid crystal layer may include a liquid crystal composition in which an organic compound is added to the liquid crystal mixture as the polymerization inhibitor, where the organic compound is having a property of inhibiting a polymerization reaction caused in the liquid crystal mixture by the light action, such as radical polymerization.

This spatial phase modulator can effectively inhibit heat damage caused by an input of high-energy light and damage caused by polymerization reaction that occurs in the spatial phase modulator.

One aspect of the present disclosure may provide a method of manufacturing a liquid crystal that includes creating a liquid crystal composition by adding, to a liquid crystal mixture, an organic compound having a property of inhibiting a polymerization reaction caused by the light action, for example, radical polymerization; and manufacturing a liquid crystal device that includes a liquid crystal layer having a property of inhibiting a polymerization reaction by using the liquid crystal composition to form a liquid crystal layer above a substrate.

EXPLANATION OF REFERENCE NUMERALS

10 . . . laser processing system, 11 . . . light source, 13 . . . beam expanding lens, 15 . . . projection element (spatial phase modulator), 17 . . . controller, 19 . . . imaging lens, 100 . . . spatial phase modulator, 110 . . . silicon substrate, 120 . . . cover glass, 130 . . . transparent electrode layer, 140 . . . first alignment film layer, 150 . . . liquid crystal layer, 160 . . . second alignment film layer, 170 . . . reflection layer, 180 . . . lower electrode layer, 190 . . . circuit layer.

MODE FOR CARRYING OUT THE INVENTION

Hereinafter, example embodiments of the present disclosure will be explained with reference to the drawings.

A spatial phase modulator 100 of the present embodiment is configured as an LCOS device that has durability against high-energy light. Particularly, the spatial phase modulator 100 of the present embodiment is configured as an LCOS device designed for a laser processing use.

In a laser processing system 10, pulsed light having a power with high peak value is emitted. The spatial phase modulator 100, which is used in the laser processing system 10, is thus required to have durability against an input of high-energy pulsed light.

Figure 1:
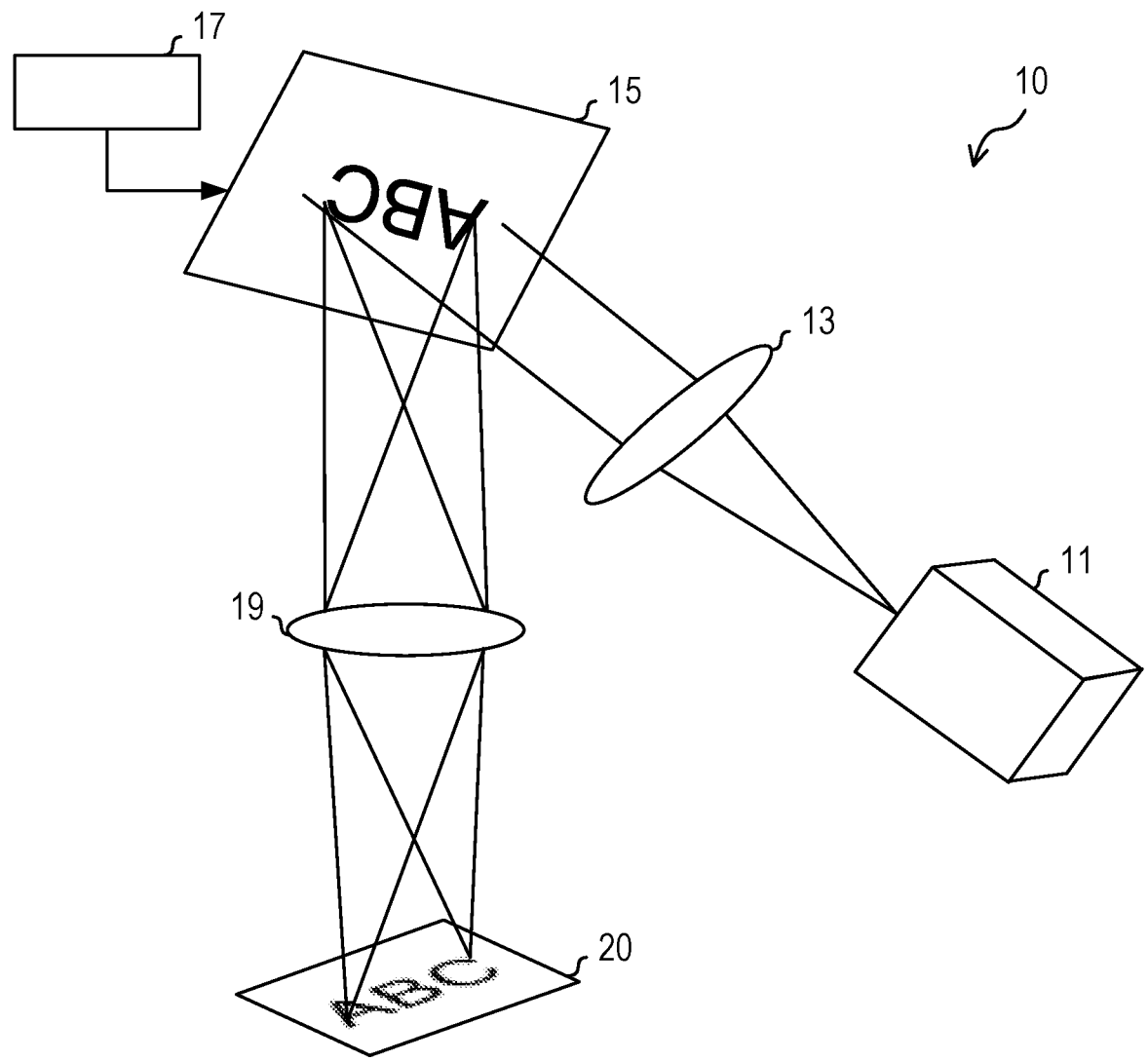
FIG. 1 is a diagram showing a schematic configuration of a laser processing system.

The laser processing system 10 shown in FIG. 1 irradiates a projection element 15 with pulsed light from a light source 11 through a beam expanding lens 13. The spatial phase modulator 100 is installed in the laser processing system 10 as this projection element 15.

The spatial phase modulator 100 includes two-dimensionally arranged electrodes corresponding to two or more pixels. The spatial phase modulator 100 is configured to modulate a phase of input light for each pixel by having these electrodes apply voltage to liquid crystal. The spatial phase modulator 100 is controlled by a controller 17 to convert the pulsed light from the light source 11 into phase-modulated light corresponding to an image that should be created on a processing-target surface 20 and output the phase-modulated light.

A phase-modulated image which corresponds to the output light from the spatial phase modulator 100 is created on the processing-target surface 20 through an imaging lens 19. This phase-modulated image serves to process the processing-target surface 20. By using this laser processing system 10, a two-dimensional image can be created on the processing-target surface 20 by a single shot of the pulsed light.

Figure 2:
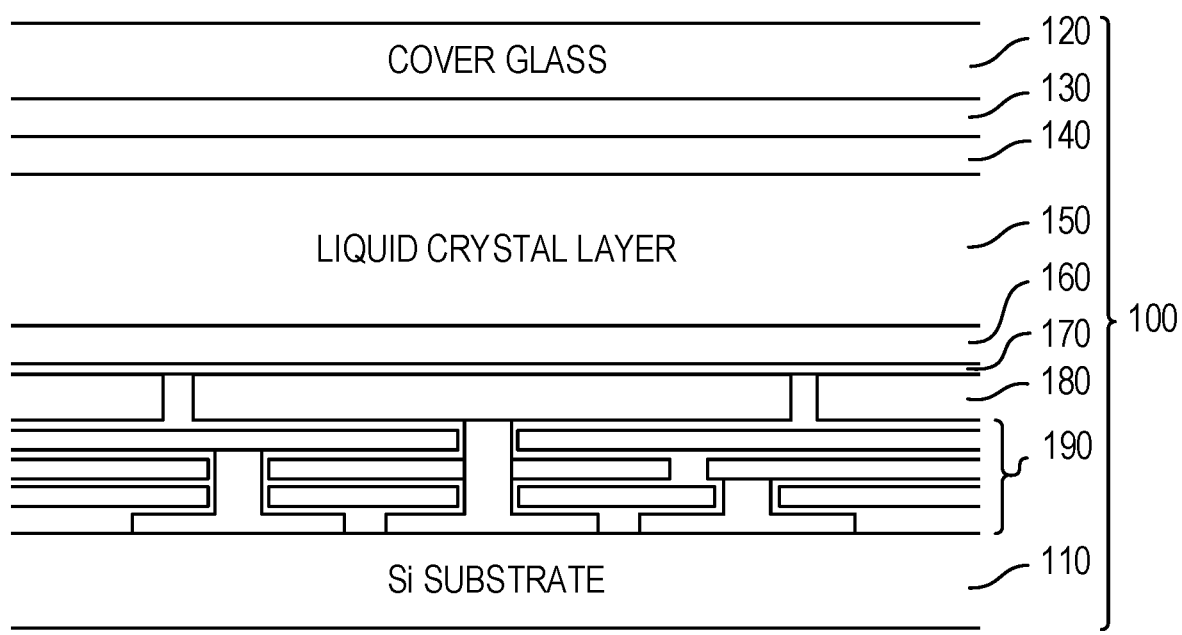
FIG. 2 is a sectional view showing an inner structure of a spatial phase modulator.

As shown in FIG. 2, the spatial phase modulator 100 of the present embodiment includes a cover glass 120, a transparent electrode layer 130, a first alignment film layer 140, a liquid crystal layer 150, a second alignment film layer 160, a reflection layer 170, a lower electrode layer 180, and a circuit layer 190 on a silicon substrate 110.

The cover glass 120 is the uppermost layer of the spatial phase modulator 100 as a solid material layer that receives an input of light. The pulsed light from the light source 11 is inputted into the cover glass 120. The transparent electrode layer 130 is disposed below the cover glass 120. The first alignment film layer 140, the liquid crystal layer 150, and the second alignment film layer 160 are disposed below the transparent electrode layer 130.

The first alignment film layer 140 is disposed above and adjacent to the liquid crystal layer 150. The second alignment film layer 160 is disposed below and adjacent to the liquid crystal layer 150. The first alignment film layer 140 and the second alignment film layer 160 are configured as vertical alignment films to control an initial alignment of liquid crystal molecules to be vertical with respect to each layer in the spatial phase modulator 100.

The liquid crystal layer 150 is disposed between the first alignment film layer 140 and the second alignment film layer 160. The liquid crystal layer 150 is affected by the first alignment film layer 140 and the second alignment film layer 160 and is configured as a vertical alignment (VA) liquid crystal layer, in which the liquid crystal molecules are vertically aligned under an electric-field-free state that is a state without an application of a voltage.

The reflection layer 170 is disposed below the second alignment film layer 160 and is configured to reflect the pulsed light, which is inputted into the cover glass 120 from above the spatial phase modulator 100 and propagated through the transparent electrode layer 130, the first alignment film layer 140, the liquid crystal layer 150, and the second alignment film layer 160 in this order.

A reflected light from the reflection layer 170 in response to an input light to the cover glass 120 propagates upwards through the second alignment film layer 160, the liquid crystal layer 150, the first alignment film layer 140, the transparent electrode layer 130, and the cover glass 120 in this order, and then outputted as the phase-modulated light of the input light.

The lower electrode layer 180 includes the aforementioned electrode for each pixel, and together with the transparent electrode layer 130, receives a drive signal from the controller 17 and, in response, applies a voltage on the liquid crystal layer 150 for each pixel. This voltage application forms an electric field in the liquid crystal layer 150. Due to this formation of the electric field, a phase shift occurs in each pixel in the light passing through the liquid crystal layer 150, which enables phase modulation.

In the spatial phase modulator 100, a heat generation that cannot be ignored is caused by absorption of high-energy light. The heat generation may cause thermal damage in the spatial phase modulator 100. Thus, each layer of the spatial phase modulator 100 of the present embodiment is formed of materials that help inhibit the thermal damage.

To inhibit the thermal damage, a material with high thermostability can be selected. Or, a material with good thermal conductivity may be selected to enable fast diffusion of heat. Or, a material with good transmissivity may be selected to inhibit heat generation due to light absorption.

In the present embodiment, the cover glass 120 is made of sapphire. The heat-proof temperature of sapphire is about 2000° C., which is higher than that of a borosilicate glass, a typical cover glass material. The thermal conductivity of sapphire is about 42 W/mK.

The transmissivity of sapphire is about 85% or greater in a wavelength band of 400 to 1000 nm. As mentioned above, the cover glass 120 made of sapphire not only has durability against heat generation but also enables efficient diffusion and dissipation of heat to outside of spatial phase modulator 100.

An applicable band of the spatial phase modulator 100, in other words, a wavelength band of the pulsed light, may be from 400 nm to 1000 nm. However, in a case where the applicable band of the spatial phase modulator 100 is expanded or shifted to a wavelength band of ultraviolet ray, the material for the cover glass 120 may be changed to quartz.

Quartz shows higher transmissivity than sapphire in the ultraviolet-ray region. Quartz however has lower thermal conductivity than sapphire, which is merely about 1 W/mK. The material for the cover glass 120 can thus be selected between sapphire and quartz depending on the applicable band of the spatial phase modulator 100.

The transparent electrode layer 130 is formed as an ITO (indium tin oxide) transparent electrode layer. ITO is a wide gap semiconductor that has an energy band gap in the ultraviolet region. Considering the function the spatial phase modulator 100 should render, the transparent electrode layer 130 is required to have transmissivity and electric conductivity. Under this condition, it is appropriate to form the transparent electrode layer 130 using ITO.

Transmissivity of the transparent electrode layer 130 is however not high compared with other layers in the spatial phase modulator 100. In other words, in the transparent electrode layer 130, heat generation is likely to occur in response to receiving the pulsed light. In addition, the heat-proof temperature of the transparent electrode layer 130 is about 600° C. or less.

This heat generated in the transparent electrode layer 130 is efficiently dissipated to the outside of spatial phase modulator 100 owing to the high thermal conductivity of the cover glass 120. This high thermal conductivity of the cover glass 120 inhibits the thermal damage of the transparent electrode layer 130.

The first and second alignment film layer 140 and 160 is formed of the inorganic alignment film layer of silicon oxide (SiOx). The heat-proof temperature of a polyimide organic alignment film layer, which is conventionally often used as an alignment film layer, is 400° C. or less.

Meanwhile, the heat-proof temperature of the inorganic alignment film layer of silicon oxide (SiOx) is about 1000° C., which is higher than the heat-proof temperatures of the transparent electrode layer 130 and the liquid crystal layer 150. Owing to the above, in the present embodiment, it is possible to inhibit a situation where the first and second alignment film layer 140 and 160 are damaged before the transparent electrode layer 130 and the liquid crystal layer 150 are damaged, which disables the spatial phase modulator 100.

Furthermore, in the present embodiment, the reflection layer 170 that is non-metallic is disposed above the lower electrode layer 180. This inhibits the heat generation in the lower electrode layer 180. The lower electrode layer 180 includes an aluminum or gold electrode as the aforementioned electrode for each pixel.

More specifically, the reflection layer 170 includes a multi-layer structure of inorganic materials. Examples of the inorganic material include silicon dioxide ($SiO_2$), titanium oxide ($TiO_2$ or $Ti_2O_3$), and magnesium fluoride $MgF_2$. Heat-proof temperature of the multi-layer structure of these inorganic materials is about 1100° C., which corresponds to melting points of these inorganic materials.

By using the multi-layer structure of the inorganic materials, it is possible to form the reflection layer 170 having the transmissivity of less than 1%, which enables inhibition of the heat generation in the reflection layer 170.

In addition, in the present embodiment, to improve the durability of the spatial phase modulator 100 against high-energy light, the liquid crystal layer 150 includes a liquid crystal composition to which a polymerization inhibitor for inhibiting radical polymerization is added.

The damage of the spatial phase modulator 100 includes those ascribable to heat generation as well as those ascribable to radical polymerization, which is a chemical reaction generated in the liquid crystal layer 150. Radical polymerization is one of polymerization reactions generated in response to light action. Shown below is a structural formula of nematic liquid crystal molecule having a tolan structure.

[Chemical Formula 1]

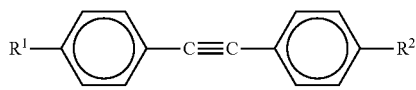

The liquid crystal composition is produced by mixing a plurality of liquid crystal compounds. Generally, liquid crystal compounds are low-molecular organic compounds, which have light sensitivity to irradiation of high-intensity light. The liquid crystal compounds are, for example, low-molecular organic compounds having stiff π-structures, flexible side chains, and polar groups.

Due to the above, a part of the structures of molecules of the liquid crystal compounds goes into an excited state by receiving the input light; and the liquid crystal compounds generate radicals. The chemical formula below explains the nematic liquid crystal molecule that has radicals generated by light action to the tolan structure.

[Chemical Formula 2]

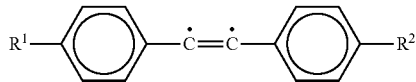

As mentioned above, the liquid crystal layer 150 of the present embodiment is a vertical alignment (VA) liquid crystal layer. A liquid crystal mixture having a nematic liquid crystalline property in a broad range of temperature, including the room temperature, is used to form the liquid crystal layer 150. In some cases, the liquid crystal mixture includes a nematic liquid crystal compound having the tolan structure.

This liquid crystal layer 150 is damaged by chain reaction of addition of monomers and progress of polymerization with highly active radicals, generated due to an action of the input light, being a chain propagation center. Accordingly, if the active radical can be inactivated by facilitating reaction to the active radical generated by the light action, this chain of polymerization reaction can be inhibited to stop the liquid crystal layer 150 from being damaged by the light action.

To achieve this, in the present embodiment, an organic compound having a property of inhibiting radical polymerization is added to the liquid crystal mixture as the polymerization inhibitor to generate the liquid crystal composition. This liquid crystal composition forms the liquid crystal layer 150.

Figure 3:
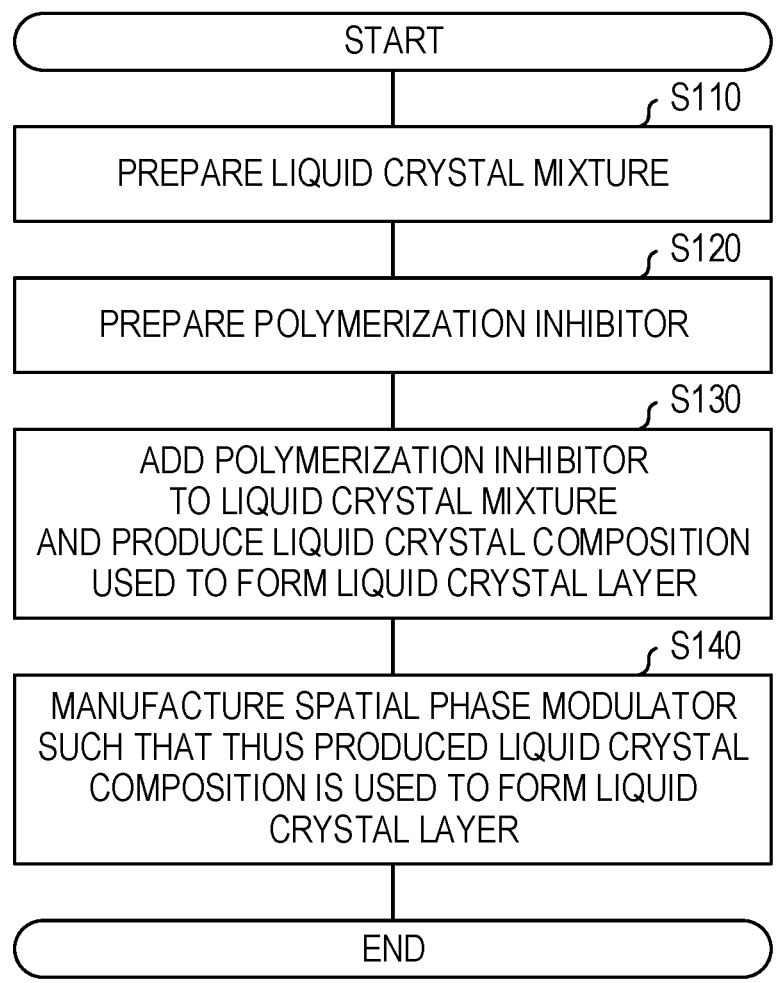
FIG. 3 is a flowchart explaining a method of manufacturing the spatial phase modulator.

In other words, in the present embodiment, the liquid crystal mixture made by mixing a plurality of liquid crystal compounds is prepared as a main material of the liquid crystal composition as shown in FIG. 3 (S110). The polymerization inhibitor is then prepared as an additive (S120). The liquid crystal composition is then produced by adding the polymerization inhibitor to the liquid crystal mixture (S130). The spatial phase modulator 100 is manufactured such that this liquid crystal composition is used to form the liquid crystal layer 150 (S140).

In the spatial phase modulator 100 thus produced, the polymerization inhibitor included in the liquid crystal layer 150 reacts with the active radical in the liquid crystal layer 150 and inactivates the active radical. Therefore, in the liquid crystal layer 150, the damage due to the radical polymerization can be inhibited by blocking a chain of the polymerization reaction.

The polymerization inhibitor can be generated from stable-radical chemical compounds and the like that catch radicals. In the present embodiment, for example, a polymerization inhibitor that is soluble in the liquid crystal mixture and has no reaction to the liquid crystal mixture may be used. In terms of easily being dissolved in the liquid crystal mixture and in terms of not largely changing the physical properties of the liquid crystal composition, an organic compound that has a structure close to the liquid crystal molecule structure can be selected as the polymerization inhibitor.

More specifically, a favorable molecular structure of the organic compound is one that has a side-chain alkyl group structure in addition to a basic structure of the polymerization inhibitor. Examples of the basic structure of the polymerization inhibitor may include hydroquinone and p-benzoquinone of quinones; o-dinitrobenzene, m-dinitrobenzene, p-dinitrobenzene, 2, 4-dinitrobenzene, 1, 3, 5-trinitrobenzene, 1, 3, 5-trinitroanisole, 1, 3, 5-trinitrotoluene, and dinitrodurene of nitro compounds; o-nitrophenol, m-nitrophenol, p-nitrophenol, 2, 4-dinitrophenol, 2, 4, 6-trinitrophenol, and nitroso of nitrophenols; nitrosobenzene, methyl-α-nitroso isopropyl ketone, phenyl-t-butylnitron of nitrone compound.

The organic compound in a liquid crystal state has a structure having both an aromatic ring structure, such as benzene ring, and alkyl group. In other words, the organic compound that has a structure close to the liquid crystal molecular structure is a chemical compound having both an aromatic ring structure and an alkyl group structure.

Specific examples of the organic compound that has a structure close to the liquid crystal molecular structure include 2-dodecylphenol, 2, 6-tert-butyl-p-cresol, tert-butyl hydroquinone, 4-tert-butylpyrocatechol, 2-tert-butyl-1, 4-benzoquinone, 6-tert-butyl-2, 4-xylenol, and 2, 6-di-tert-butylphenol. These example organic compounds has alkyl group having C3, which is carbon number of 3, or more. The aforementioned organic compounds, which include alkyl group with carbon number of 3 or more, are particularly easily dissolved in the liquid crystal mixture and thus are suited for a high-concentrated addition.

Structural formula of 2-dodecylphenol is shown below.

[Chemical Formula 3]

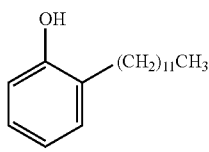

Structural formula of 2, 6-tert-butyl-p-cresol is shown below.

[Chemical Formula 4]

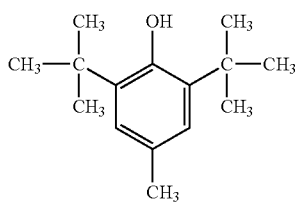

Structural formula of tert-butyl hydroquinone is shown below.

[Chemical Formula 5]

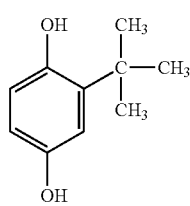

Structural formula of 4-tert-butyl pyrocatechol is shown below.

[Chemical Formula 6]

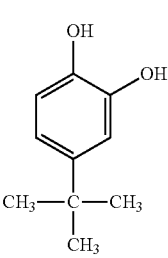

Structural formula of 2-tert-butyl-1, 4-benzoquinone is shown below.

[Chemical Formula 7]

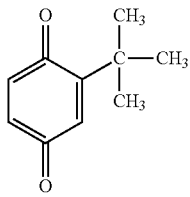

Structural formula of 6-tert-butyl-2, 4-xylenol is shown below.

[Chemical Formula 8]

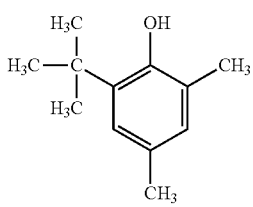

Structural formula of 2, 6-di-tert-butylphenol is shown below.

[Chemical Formula 9]

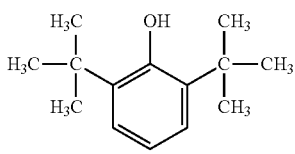

To form the liquid crystal layer 150, one or more of the aforementioned examples of organic compound, which has a structure close to the liquid crystal molecular structure, may be used as the polymerization inhibitor. For example, to form the liquid crystal layer 150, 2-dodecylphenol (molecular formula: $C_{18}H_{30}O$; molecular weight: 262.44) may be used as the polymerization inhibitor. Or, 2, 6-di-tert-butyl-p-cresol (molecular formula: $C_{15}H_{24}O$; molecular weight 220.36) may be used as the polymerization inhibitor.

Such polymerization inhibitors can effectively inhibit the radical polymerization caused by the light action to the structure of molecules such as the tolan structure. Nevertheless, the polymerization inhibitor should not be limited to these specific examples. Commercially available polymerization inhibitors (also called polymerization blockers, polymerization preventing agents, or anti-polymerization agents) may also be used.

The aforementioned polymerization inhibitors may be added to the liquid crystal mixture in a range from 0.01 wt. % to 20 wt. %; more specifically, from 0.05 wt. % to 10 wt. %; yet more specifically, from 3 wt. % to 10 wt. %.

Due to the above, the liquid crystal layer 150 may include the liquid crystal composition containing the polymerization inhibitor in a range from 0.01 wt. % to 20 wt. %; more specifically, from 0.05 wt. % to 10 wt. %; yet more specifically, from 3 wt. % to 10 wt. %. Durability of the liquid crystal layer 150 against high-energy light is particularly improved by adding 3 wt. % or more of the polymerization inhibitor. The amount of the polymerization inhibitor to be added can be determined through experiments and the like to an amount that is optimum for inhibiting damage by radical polymerization while keeping the phase modulation property of the spatial phase modulator 100.

Figure 4:
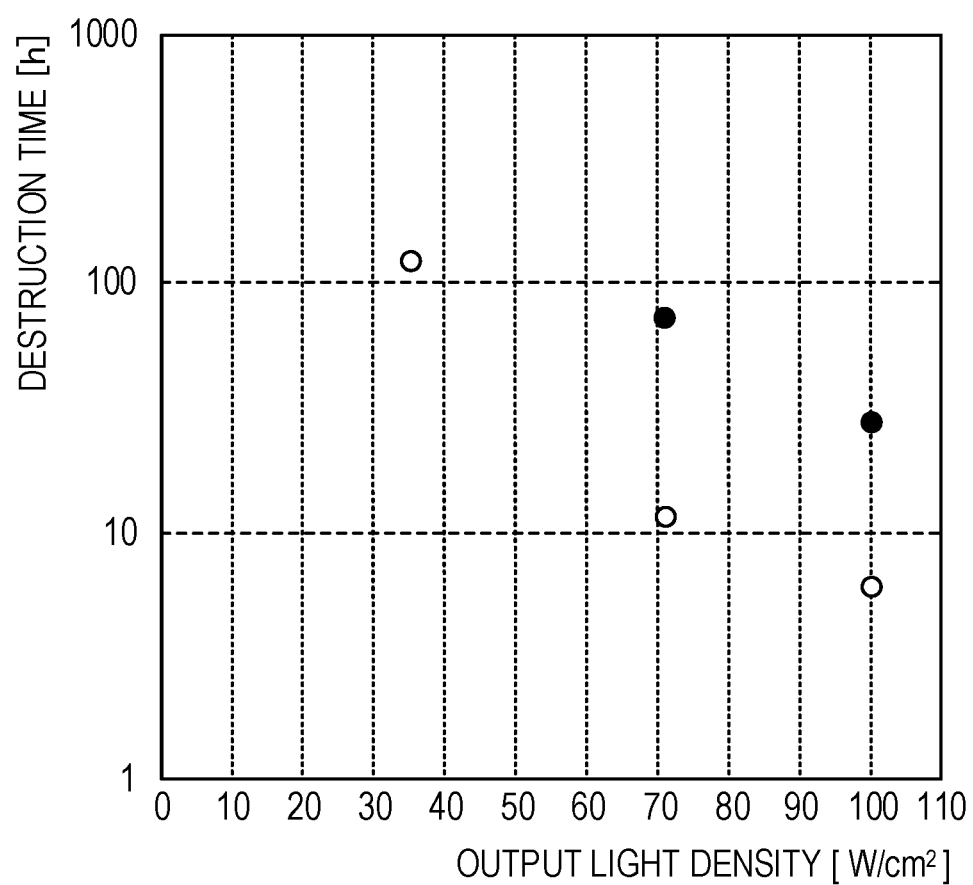
FIG. 4 is a graph showing experimental results with respect to an addition of a polymerization inhibitor.

FIG. 4 shows output light density of light that is inputted to the liquid crystal layer 150 on the horizontal axis, and destruction time on logarithmic scale on the vertical axis. The graph shows, by black dots, a destruction time of the liquid crystal layer 150 with 5 wt. % of the polymerization inhibitor added and, by white dots, a destruction time of a conventional liquid crystal layer with no polymerization inhibitor added. As the graph tells, when high-energy light is inputted to the liquid crystal layer 150, damage of the liquid crystal layer 150 can be effectively inhibited by the addition of the polymerization inhibitor.

As explained above, the liquid crystal layer 150 in the present embodiment includes the liquid crystal composition, to which the organic compound that has the property of inhibiting the radical polymerization is added. This enables the spatial phase modulator 100 to have high durability against the input of high-energy light.

In the present embodiment, by selecting materials in consideration of heat generation due to light absorption, the thermal damage in the spatial phase modulator 100 can also be inhibited. Accordingly, it is possible to provide the spatial phase modulator 100 that has high durability not only against damage due to the polymerization reaction but also against thermal damage. Such a spatial phase modulator 100 can form a laser processing system 1 having excellent durability.

Generally, liquid crystal materials are selected to achieve desired optical performance such as of a response speed and a modulation amount. Altering the selection of the liquid crystal material in consideration of damage leads to a degradation of optical performance. In the present embodiment, damage is inhibited by adding the polymerization inhibitor; therefore, durability against high-energy light can be improved while maintaining the optical performance without altering the liquid crystal material. The technique of the present disclosure is therefore very productive.

It should be noted that the present disclosure should not be limited to the aforementioned embodiments and may be embodied in various modes. The technique of the present disclosure should not be limited to the application to spatial phase modulators but also can be applied to LCOS devices and liquid crystal devices of different usages.

The technique of the present disclosure should not be limited to the application to the reflective liquid crystal device as shown in FIG. 2 but also can be applied to transmissive liquid crystal devices. The technique of the present disclosure may also be applied to horizontal alignment (HA) type liquid crystal devices and IPS (In Plane Switching) type liquid crystal devices.

For example, the technique of the present disclosure may be applied to a liquid crystal device that includes alignment films, which horizontally control the initial alignment of the liquid crystal molecules in the liquid crystal layer, between the liquid crystal layer and the transparent electrode layer and between the liquid crystal layer and the lower electrode layer; and that includes the liquid crystal layer as the horizontal alignment (HA) liquid crystal layer. In other words, the liquid crystal layer 150 of the aforementioned spatial phase modulator 100 may be configured as the horizontal alignment (HA) liquid crystal layer including the alignment films for horizontal alignment as the first and second alignment film layers 140 and 160.

The technique of the present disclosure includes an idea of forming the liquid crystal composition by adding, to the liquid crystal mixture, the organic compound having a property of inhibiting the polymerization reaction caused by the light action, and then forming the liquid crystal layer by using the liquid crystal composition to manufacture the liquid crystal device that includes the liquid crystal layer having a property of inhibiting the polymerization reaction caused by the light action. Therefore, the liquid crystal layer 150 may also be formed by the liquid crystal composition to which the polymerization inhibitor that is not only against the radical polymerization but also against other polymerization reaction caused by the light action is added.

Functions of one element in the aforementioned embodiments may be achieved by two or more elements. Functions of two or more elements in the aforementioned embodiments may be achieved by one element. A part of the configuration of the aforementioned embodiments may be omitted. Any and all modes included in the technical ideas identified by the languages recited in the claims are embodiments of the present disclosure.

The invention claimed is:

1. An optical system for a laser processing use, the system comprising:
   a light source;
   a controller; and
   a spatial phase modulator configured, by being controlled by the controller, to phase-modulate laser light input from the light source so as to generate a phase-modulated light corresponding to an image that is created on a processing-target surface and to output the phase-modulated laser light,
   the laser light being high-energy pulsed light to form a non-temporary image on the processing-target surface,
   the optical system being configured to process the processing-target surface by irradiation of the phase-modulated light on the processing-target surface,
   the spatial phase modulator being a liquid crystal device, the liquid crystal device comprising:
      a liquid crystal layer; and
      an electrode layer configured to create an electric field in the liquid crystal layer,
      wherein the liquid crystal layer includes a liquid crystal composition in which an organic compound having a property of inhibiting a polymerization reaction caused by light action is added to a liquid crystal mixture as a polymerization inhibitor, and
      wherein the liquid crystal composition includes 3 wt. % to 20 wt. % of the polymerization inhibitor.

2. The optical system according to claim 1, wherein the polymerization inhibitor has a property of inhibiting radical polymerization.

3. The optical system according to claim 1,
   wherein the liquid crystal mixture includes a liquid crystal compound having a tolan structure, and
   wherein the polymerization inhibitor inhibits radical polymerization caused by light action to the tolan structure.

4. The optical system according to claim 1, wherein the liquid crystal composition includes 3 wt. % to 10 wt. % of the polymerization inhibitor.

5. The optical system according to claim 1, wherein the polymerization inhibitor is an organic compound having an aromatic ring structure, and an alkyl group structure having carbon number 3 or greater.

6. The optical system according to claim 1, wherein the electrode layer comprises:
   a transparent electrode layer disposed above the liquid crystal layer; and a lower electrode layer disposed below the liquid crystal layer, wherein alignment films, configured to control an initial alignment of liquid crystal molecules in the liquid crystal layer vertically or horizontally, are disposed between the liquid crystal layer and the transparent electrode layer, and between the liquid crystal layer and the lower electrode layer, and wherein the liquid crystal layer is formed as a vertical alignment (VA) liquid crystal layer or a horizontal alignment (HA) liquid crystal layer.

7. The optical system according to claim 1, wherein the spatial phase modulator is created as an LCOS device.

8. The optical system according to claim 1, wherein the liquid crystal mixture demonstrates a nematic liquid crystalline property.

9. A method of manufacturing the spatial phase modulator used for the optical system according to claim 1, the method comprising:

creating a liquid crystal composition including 3 wt. % to 20 wt. % of the polymerization inhibitor by adding, to a liquid crystal mixture, an organic compound having a property of inhibiting a polymerization reaction caused by light action, as a polymerization inhibitor; and manufacturing the spatial phase modulator by using the liquid crystal composition, the spatial phase modulator comprising:

a liquid crystal layer; and an electrode layer configured to create an electric field in the liquid crystal layer, the liquid crystal layer being formed by using the liquid crystal composition.

10. The method of manufacturing the spatial phase modulator according to claim 9, wherein the organic compound includes a property of inhibiting radical polymerization.

11. The method of manufacturing the spatial phase modulator according to claim 9, wherein the liquid crystal mixture includes a liquid crystal compound having a tolan structure, and wherein the organic compound has a property of inhibiting radical polymerization caused by light action to the tolan structure.

12. The method of manufacturing the spatial phase modulator according to claim 9, wherein the liquid crystal composition includes 3 wt. % to 10 wt. % of the organic compound.

13. The method of manufacturing the spatial phase modulator according to claim 9, wherein an organic compound having an aromatic ring structure and an alkyl group structure having carbon number 3 or greater is added to the liquid crystal mixture.

* * * * *